US010565571B2

(12) United States Patent
Kanjlia et al.

(10) Patent No.: US 10,565,571 B2
(45) Date of Patent: Feb. 18, 2020

(54) SYSTEMS AND METHODS FOR EFFECTING APPLICATION PROGRAMMING INTERFACES FOR PERSONAL PAYMENT TRANSACTIONS

(71) Applicants: Gagan Kanjlia, Ashburn, VA (US); Scott Zimmer, Charlotte, NC (US); Robert J Larson, Havertown, PA (US); Alexander S. Wilson, Kenneth Square, PA (US); Vishal Puri, Ashburn, VA (US); Jay F. Pober, Cherry Hill, NJ (US)

(72) Inventors: Gagan Kanjlia, Ashburn, VA (US); Scott Zimmer, Charlotte, NC (US); Robert J Larson, Havertown, PA (US); Alexander S. Wilson, Kenneth Square, PA (US); Vishal Puri, Ashburn, VA (US); Jay F. Pober, Cherry Hill, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 14/108,808

(22) Filed: Dec. 17, 2013

(65) Prior Publication Data
US 2014/0172693 A1 Jun. 19, 2014

Related U.S. Application Data

(60) Provisional application No. 61/739,340, filed on Dec. 19, 2012.

(51) Int. Cl.
*G06Q 40/00* (2012.01)
*G06Q 20/10* (2012.01)

(52) U.S. Cl.
CPC .................. *G06Q 20/10* (2013.01)

(58) Field of Classification Search
CPC ...................................... G06Q 20/10
(Continued)

(56) References Cited

U.S. PATENT DOCUMENTS 8,121,945 B2   2/2012  Rackley et al.
8,321,383 B2 * 11/2012  Schumacher ..... G06F 16/24556
                                                  707/688

(Continued)

FOREIGN PATENT DOCUMENTS

EP      1866801     10/2006

OTHER PUBLICATIONS

Mobile and Alternative Payments in the U.S., 3rd Edition Publication info: PR Newswire [New York] Jan. 29, 2013. Databases: ABI/INFORM® Professional Advanced, ProQuest Newsstand Professional (Year: 2013).*

*Primary Examiner* — Bruce I Ebersman
*Assistant Examiner* — John A Anderson
(74) *Attorney, Agent, or Firm* — Finnegan, Henderson, Farabow, Garrett & Dunner, LLP (57) ABSTRACT

Systems, processes, and computer programs are disclosed for facilitating personal payment transactions. In some embodiments, disclosed embodiments may provide an interface dialog engine for providing a dynamic and customized interface for effecting the personal payment transaction; a funding source engine for providing options to fund the payment; an payee identity engine for identifying the intended payee receiving the payment; a routing option engine for providing options to route the payment; and a messaging engine for providing channels for related parties to the personal payment transaction to communicate.

16 Claims, 5 Drawing Sheets

(58) Field of Classification Search
USPC .................................................. 705/35–44
See application file for complete search history.

(56) References Cited

U.S. PATENT DOCUMENTS

| | | | | |
|---|---|---|---|---|
| 2007/0011089 A1* | 1/2007 | DeSchryver | ........... | G06Q 20/04 |
| | | | | 705/39 |
| 2009/0319425 A1* | 12/2009 | Tumminaro | ......... | G06Q 20/108 |
| | | | | 705/42 |
| 2011/0060684 A1* | 3/2011 | Jucht | .................... | G06Q 20/108 |
| | | | | 705/42 |
| 2011/0213707 A1* | 9/2011 | Jackson | ................ | G06Q 20/10 |
| | | | | 705/44 |
| 2012/0215648 A1* | 8/2012 | Rose | ...................... | G06Q 20/12 |
| | | | | 705/16 |
| 2012/0244930 A1* | 9/2012 | Cage | .................. | G07F 17/3244 |
| | | | | 463/25 |
| 2012/0284175 A1* | 11/2012 | Wilson | .................. | G06Q 20/10 |
| | | | | 705/39 |
| 2013/0060689 A1 | 3/2013 | Oskolkov et al. | | |
| 2013/0144785 A1* | 6/2013 | Karpenko | ........... | G06Q 20/409 |
| | | | | 705/44 |
| 2013/0166332 A1 | 6/2013 | Hammad | | |

* cited by examiner

SYSTEMS AND METHODS FOR EFFECTING APPLICATION PROGRAMMING INTERFACES FOR PERSONAL PAYMENT TRANSACTIONS

RELATED APPLICATIONS

This application claims priority to U.S. Provisional Application No. 61/739,340, filed Dec. 19, 2012, which is hereby incorporated by reference in its entirety.

FIELD

The disclosed embodiments generally relate to personal payment systems, and more particularly, to systems, processes, and computer programs for facilitating users to effect personal payment transactions.

Electronic personal payment transactions, such as person-to-person payment and person-to-business payment, represent a rapidly growing industry. Current personal payment systems, however, are often inflexible and inconvenient. There is no payment gateway where money movement may be completed through a singular portal irrespective of payment medium. For example, a payee may have to create an account with a financial service provider in order to collect the payment delivered by that financial service provider. Another example of the inflexibility of existing personal payment systems is the lack of customization with respect to sending and receiving payment. For example, current systems do not provide mechanisms to aid and facilitate decisions surrounding the potential routing of payments for both generic and specific types of payments.

Lack of flexible and distinct payment channels may cause the user to research different payment platforms. This may also require the user to look up information, and make complex multiple parameter evaluations with regards to overall functionality of a given transaction. Moreover, the payer is offered limited flexibility or optionality with regards to the sourcing of the funds. In addition, the payee is usually not offered options as to how the payment should be received, and consequently, the payee has no influence over the cost, the speed, and the stability of the payment route.

Furthermore, existing personal payment systems may cause users inconvenience due to the lack of mechanisms that could minimize the efforts of the payer to initiate or complete a payment transaction. Examples of these inconveniences may include, for example, the payer may have to spend a considerable amount of time to set up an account to effect a transaction; the payer may have to manually look up the payee's information, for example, the payee's bank account number, in order to set up and complete a transaction; the payer and the payee may not freely choose a payment rail; and the payee may not be able to withdraw the payment immediately if the payee receives a check that deposited into his bank account.

Moreover, existing personal payment systems are built around the system provider needs rather than the needs or desires of their users. Current systems thus focus on merely effecting the payment itself, with limited additional interaction with the users.

Furthermore, existing personal payment systems have limited functionality to facilitate group or crowd payments/collections. Existing personal payment systems also lack mechanisms that, for example, to provide feedback to users with respect to the status of payments or how they were received.

Moreover, existing personal payment systems provide no way for payers to easily look up payee information. Rather, payers typically need to pre-collect payee information (such as routing numbers and account numbers) and cannot rely on outside sources to supplement/verify account information. This can lead to payments going to incorrect payees as well as general lack of confidence in the payment system.

Thus, existing personal payment systems are limited, inflexible, inconvenient, and not personalized. It is therefore desirable to provide mechanisms that allow users to easily and efficiently to effect personal payment transactions.

SUMMARY

Disclosed embodiments include systems, methods and computer programs—for example, Application Programming Interfaces (APIs)—for allowing a user to easily and accurately complete personal payment transactions. Disclosed embodiments include mechanisms that generate a dynamic and customized interface for a payer for effecting a personal payment transaction, identify possible payees via social networks, local databases or contact lists, or public identity databases, provide suggested recipients to the payer for identifying the payee based on the identifying information received from the payer, provide funding and routing options to the payer and/or the payee for routing the payment associated with the personal payment transaction, and provide channels for the payer and the payee to communicate. Further disclosed embodiments enable a payee to determine the payer's identity based on interactions with databases of identity information. Further disclosed embodiments also enable interaction with multiple diverse payment networks and gateways to facilitate transfer of payments and related information flows.

Consistent with some disclosed embodiments, tangible computer-readable storage media may store program instructions that are executable by one or more processors to implement any of the processes disclosed herein.

It is to be understood that both the foregoing general description and the following detailed description are exemplary and explanatory only, and are not restrictive of the disclosed embodiments.

DESCRIPTION OF THE EMBODIMENTS

It is to be understood that the following detailed description is exemplary and explanatory only and is not restrictive of disclosed embodiments. For example, steps or processes disclosed herein are not limited to being performed in the order described, but may be performed in any order, and that some steps may be omitted, consistent with the disclosed embodiments.

Reference will now be made in detail to exemplary embodiments, examples of which are illustrated in the accompanying drawings and disclosed herein. Wherever convenient, the same reference numbers may be used in the drawings and the following description to refer to the same or similar parts. Also, similarly named elements may perform similar functions and may be similarly designed. Numerous details are set forth to provide an understanding of the embodiments described herein. In some cases, the embodiments may be practiced without these details. In other instances, well-known techniques and/or components may not be described in detail to avoid obscuring described embodiments. While several exemplary embodiments and features are described herein, modifications, adaptations, and other implementations may be possible, without departing from the spirit and scope of the disclosure. Accordingly, the following detailed description does not limit the disclosure.

Figure 1:
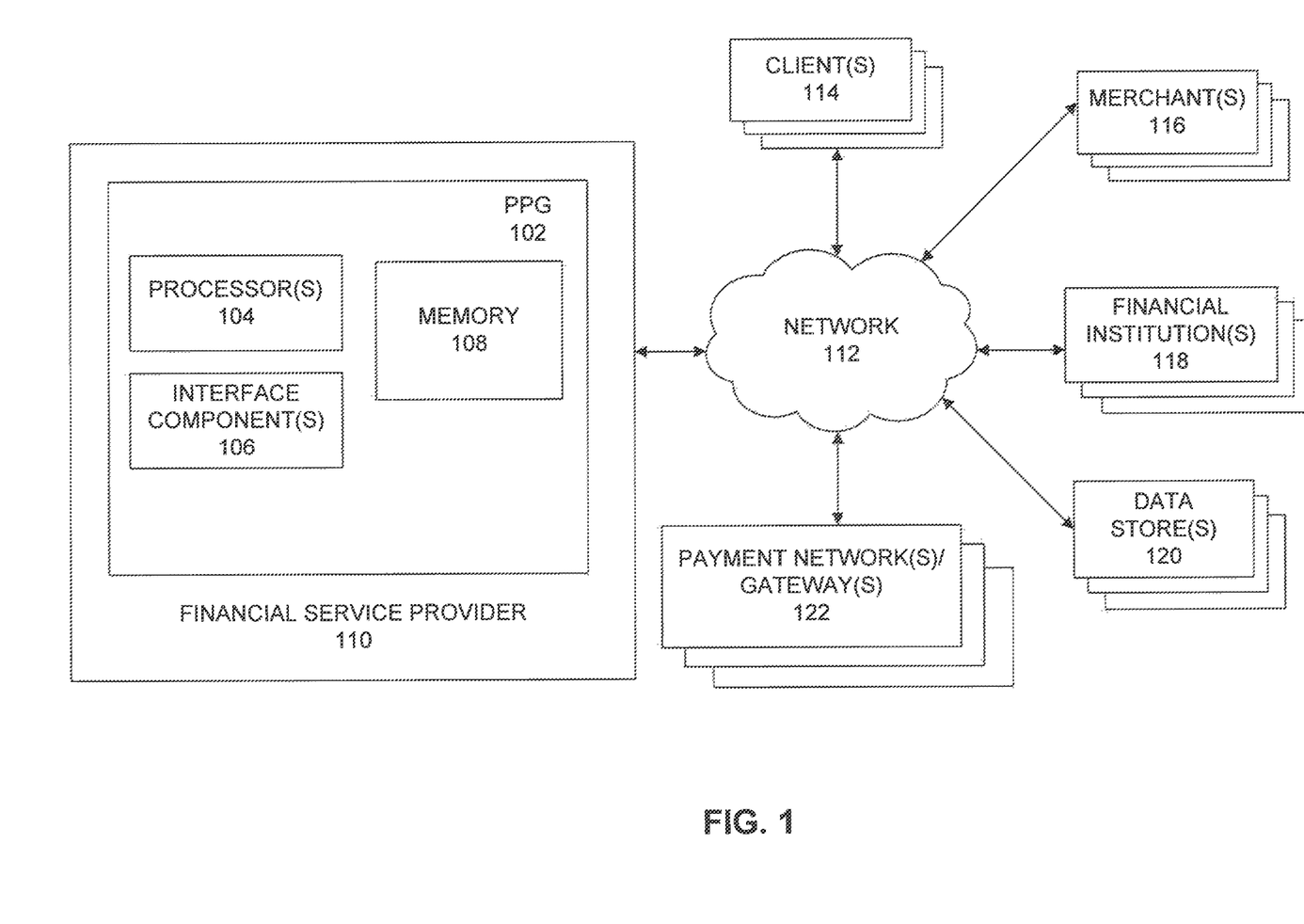
FIG. 1 is diagram of an exemplary system that may be used to implement disclosed embodiments.

FIG. 1 shows an exemplary system configured to execute one or more software processes that, when executed, provide one or more aspects of the disclosed embodiments. The components and arrangement shown in FIG. 1 are not intended to be limiting to the disclosed embodiment as the components used to implement the processes and features disclosed here may vary.

In accordance with disclosed embodiments, system 100 may include financial service provider 110, Personal Payment Genie 102, network 112, one or more clients 114, one or more merchants 116, and one or more financial institutions 118. System 100 may include other components to provide, collect, process, and transmit information consistent with the disclosed embodiments.

Personal Payment Genie ("PPG") 102 may be a computer-based system including computer system components, such as one or more servers, desktop computers, workstations, tablets, hand held computing devices, memory devices, and/or internal network(s) connecting the components. In some embodiments, PPG 102 may be a server that includes one or more processor(s) 104, memory devices, such as memory 108, and interface components 106. PPG 102 may be a single server or may be configured as a distributed computer system including multiple servers or computers that interoperate to perform one or more of the processes and functionalities associated with the disclosed embodiments. In some embodiments, PPG 102 may be a server that is associated with financial service provider 110. Financial service provider 110 may represent, for example, a bank, a merchant, a credit card provider, or any other entity that provides financial services to customers. In one aspect, financial service provider 110 may be an institution or an individual that collects and processes personal payment for certain transactions, and transfers the personal payment to one or more intended payees.

Processor(s) 104 may be one or more known processing devices, such as a microprocessor from the Pentium™ family manufactured by Intel™ or the Turion™ family manufactured by AMD™. Processor(s) 104 may include a single core or multiple core processor system that provides the ability to perform parallel processes simultaneously. For example, processor(s) 104 may be a single core processor that is configured with virtual processing technologies known to those skilled in the art. In some embodiments, processor(s) 104 may use logical processors to simultaneously execute and control multiple processes. Processor(s) 104 may implement virtual machine technologies, or other similar known technologies to provide the ability to execute, control, run, manipulate, store, etc. multiple software processes, applications, programs, etc. In another embodiment, processor(s) 104 may include a multiple-core processor arrangement (e.g., dual or quad core) that is configured to provide parallel processing functionalities to allow PPG 102 to execute multiple processes simultaneously. One of ordinary skill in the art would understand that other types of processor arrangements could be implemented that provide for the capabilities disclosed herein.

PPG 102 may also include one or more storage devices configured to store instructions used by processor(s) 104 (or other components) to perform certain functions related to the disclosed embodiments. In one example, PPG 102 may include memory 108 that includes instructions to enable processor(s) 104 to execute one or more applications, such as server applications, network communication processes, or any other type of application or software available on computer systems. Alternatively, the instructions, application programs, etc. may be stored in an external storage or available from a memory over a network. The one or more storage devices may be a volatile or non-volatile, magnetic, semiconductor, tape, optical, removable, nonremovable, or other type of storage device or tangible computer-readable medium.

Methods, systems, and computer programs consistent with the disclosed embodiments are not limited to separate programs or computers configured to perform dedicated tasks. For example, PPG 102 may include a memory that may include one or more programs to perform one or more functions for multiple user display control. Moreover, processor(s) 104 may execute one or more programs located remotely from system 100. For example, system 100 may access one or more remote programs, that, when executed, perform functions related to disclosed embodiments. Memory 108 may include one or more memory devices that store data and instructions used to perform one or more features of the disclosed embodiments. Memory 108 may also include any combination of one or more databases controlled by memory controller devices (e.g., serve (s), etc.) or software, such as document management systems, Microsoft SQL databases, SharePoint databases, Oracle™ databases, Sybase™ databases, or other relational databases.

PPG 102 may also be communicatively connected to one or more memory devices (e.g., databases (not shown)) locally or through a network. The remote memory devices may be configured to store information and may be accessed and/or managed by PPG 102. By way of example, the remote memory devices may be document management systems, Microsoft SOL database. SharePoint databases, Oracle™ databases, Sybase™ databases, or other relational databases. Systems, processes, computer programs, and tangible computer-readable medium of disclosed embodiments, however, are not limited to separate databases or even to the use of a database.

PPG 102 may also include one or more I/O devices that may comprise one or more interfaces for receiving signals or input from input devices and providing signals or output to one or more output devices that allow data to be received and/or transmitted by PPG 102. For example, PPG 102 may include interface components 106 that may provide interfaces to one or more input devices, such as one or more keyboards, mouse devices, and the like, that enable PPG to receive data from one or more users such as client(s) 114. Furthermore, interface components 106 may include components configured to send and receive information between components of PPG 102 or external to PPG 102, such as network 112.

Network 112 may be any type of network that provides communications, exchanges information, and/or facilitates the exchange of information between PPG 102 and client(s) 114. In one embodiment, network 112 may be the Internet, a Local Area Network, or other suitable connection(s) that enables system 100 to send and receive information between the components of system 100.

Client(s) 114 may be one or more computer systems. For example, client(s) 114 may include a general purpose or notebook computer, a mobile device with computing ability, a server, a desktop computer, tablet, or any combination of these computers and/or affiliated components. For example, client(s) 114 may be a smartphone, which is adopted to perform all the functions consistent with the disclosed embodiments. In some embodiments, each client may be a computer system or device that is operated by a user who is a customer or a potential customer of financial service provider 110. Client(s) 114 may be configured with storage that stores one or more operating systems that perform known operating system functions when executed by one or more processors. By way of example, the operating systems may include Microsoft Windows™, Unix™, Linux™, Apple™ Computers type operating systems, Personal Digital Assistant (PDA) type operating systems, such as Microsoft CE™, or other types of operating systems. Accordingly, embodiments of the disclosed invention will operate and function with computer systems running any type of operating system. Client(s) 114 may also include communication software that, when executed by a processor, provides communications with network 112, such as Web browser software, tablet or smart hand held device networking software, etc.

Merchant(s) 116 may include systems operated by, for example, online retailers, brick-and-mortar retailers, or the like. Merchant(s) 116 may be communicatively connected to other devices of System 100 through, for example, Network 112 or direct connection. Merchant(s) 116 may receive and send payments consistent with disclosed embodiments.

Financial Institution(s) 118 ("FI") may include systems operated by, for example, financial institutions other than financial service provider 110 (i.e. those not affiliated with or part of the institution operating financial service provider 110). A 118 may be communicatively connected to other devices of System 100 via, for example, Network 112 or direct connection. For example, A 118 may be operated by a bank, a credit union, a banking cooperative, or the like. A 118 may receive and send payments consistent with disclosed embodiments.

Data Store(s) 120 may include systems operated by, for example, social network services, databases, search engines, identity aggregators, or the like Consistent with disclosed embodiments, Data Store(s) 120 may store information allowing for the search and determination of a user's identity without having to know the complete account information. For example, knowledge of the user's identity, in some embodiments, can lead to the determination of the account information necessary to transfer/receive funds based on the information stored in Data Store(s) 120.

Payment Network(s)/Gateway(s) 122 may include systems operated by, for example, payment processors or networks (such as credit card processors interbank networks). Payment Network(s)/Gateway(s) 122 can, in some embodiments, enable flow of money and information between unrelated Financial Institution(s) 118.

Figure 2:
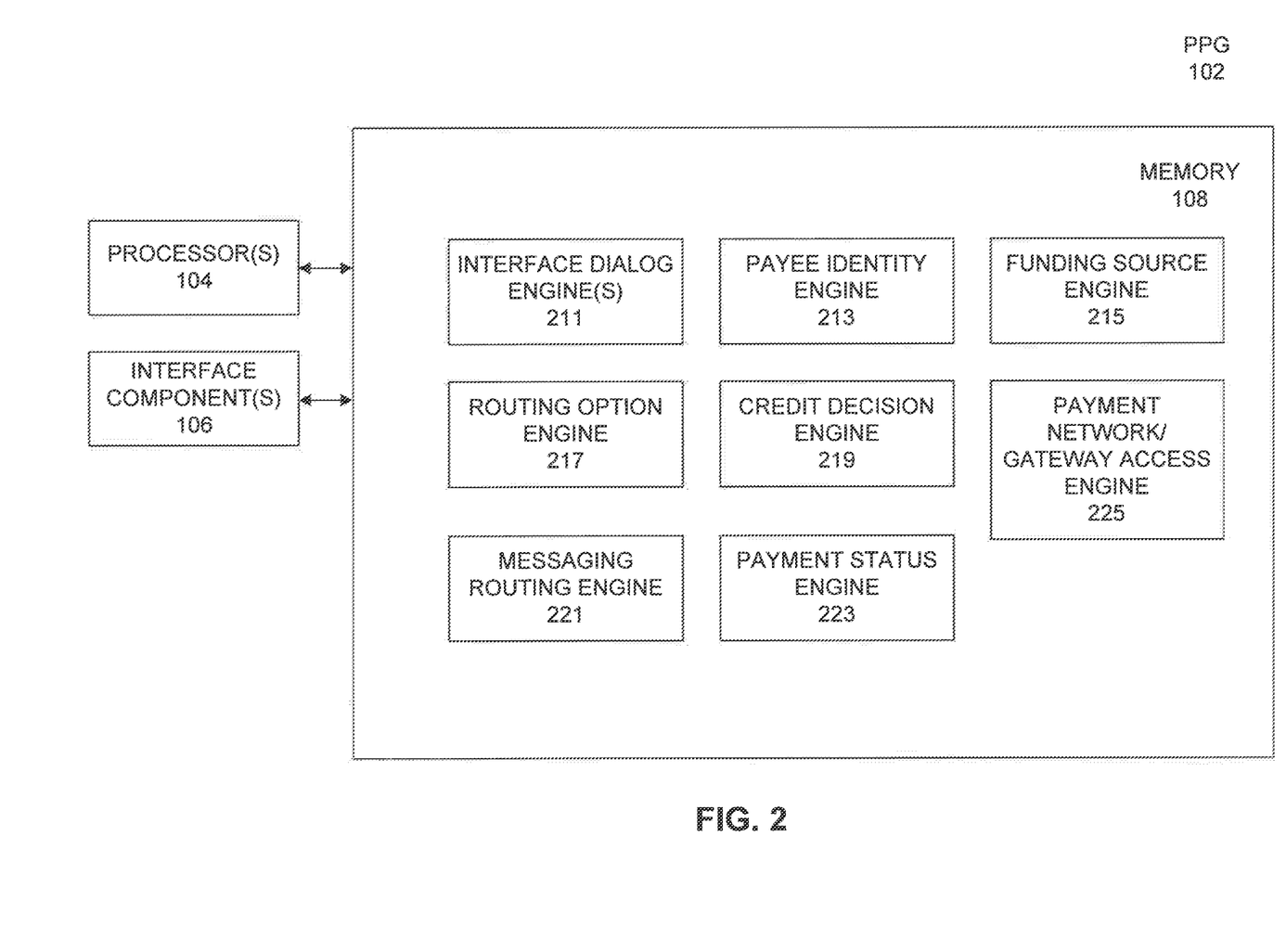
FIG. 2 is a diagram of some exemplary engines for implementing some aspects of disclosed embodiments.

FIG. 2 illustrates a number of engines that may be, in some embodiments, used to implement disclosed embodiments. The disclosed "engines" (also known as "modules") may be implemented in software, hardware, firmware, a mix of any of those, or the like. For example, modules illustrated in FIG. 2 (as well as other modules not necessarily illustrated in this Figure) may be implemented in the form of Application Programming Interfaces (APIs). APIs enable hardware (such as a mobile device, computer, electronic components, or the like), firmware (such as ROM or other hard-wired logic components, or the like), and software (such as operating systems, application programs, or the like) to all interact with one another. APIs, in some embodiments, may be broadly classified into two separate categories—one set for interfacing with social networks, identity aggregators, databases, or the like; and a second set for interfacing with payment networks and gateways to facilitate payment and information transfer between parties.

Processor(s) 204, Interface Components 206, and Memory 208 may be utilized to perform processes to implement and facilitate the operation of the illustrated engines in FIG. 2. These engines may include software, hardware, or firmware instructions (or a combination thereof) executable by one or more processors, such as processor(s) 204, alone or in various combinations with other engines disclosed in this or other embodiments.

To provide a natural and intuitive interaction to effect the payment transaction, in some embodiments, interface dialog engine(s) 211 may be configured to dynamically determine an appropriate user interface for a particular user of PPG 202. For example, if a user is technologically experienced, interface dialog engine 211 may determine whether the user interface for this user will have a different look and feel from a user interface for another user who is less technologically experienced. Additionally or alternatively, interface dialog engine(s) 211 may be configured to provide mechanisms that allow the user to interact with PPG 202 via a voice-controlled input.

To minimize the payer's efforts of providing information relating to the payment transaction, payee identity engine 213 may be configured to provide one or more suggested recipients that could potentially be the intended payee of the payment transaction based on the payer's input of one or more pieces of information about his/her intended payee (e.g., the payee's name). Information about the payee may be provided in the form of voice, typing, token, shortlisted entry, or the like. In some embodiments, payee identity engine 213 may be configured to provide the suggested recipients of the payment by using the following multiple sources:

phone contacts,
electronic mail contact lists,
social networking sites,
website user accounts,
white pages,
checking account profile information, or
any other sources.

Payee Identity Engine 213 may, in some embodiments, interact with Data Store(s) 120 from FIG. 1 in order to accurately and conveniently identify a recipient of funds. For example, Payee Identity Engine 213 may interact with social networks such as Facebook, Google+, LinkedIn, Quora, Pinterest, Twitter, Yahoo, Orkut, Myspace, Badoo, Classmates.com, Foursquare, or the like. Additionally, Payee Identity Engine 213 may interact with databases, such as contact lists on the user's mobile device (such as a mobile phone) or predefined savings/checking account contacts (e.g., entities/people/companies that the payer frequently transmits funds to). Furthermore, Payee Identity Engine 213 may interact with public identity aggregators, such as white pages or other official/unofficial identity aggregators. All of these sources enable better identification of the payee's identity.

To better assist the payer to identify the payee and ensure accuracy, in some embodiments, payee identity engine 213 may be configured to estimate a level of confidence with respect to the identity of the intended payee, and provide an ordered list of the suggested recipients by the level of confidence. For example, once the payer provides the name and/or any other information about the intended payee, payee identity engine 213 may be configured to determine the confidence level for each of the suggested recipients. In some embodiments, the confidence level indicates the perceived likelihood that the suggested recipient(s) is the person that the payer intends to send the payment. The confidence level may increase if multiple independent data sources (such as the above-mentioned social networks, public identity aggregators, or databases) are utilized to suggest recipients of the payment. In some embodiments, payee identity engine 213 may be configured to consider one or more of the following factors to estimate the level of confidence:

payment and/or other user history,
 the quality of the data source,
 probability of coincidence,
 the form of payment,
 the proximity between the payer and the intended payee(s),
 physical presence of the payer and/or the intended payee(s), and
 any other factors.

To ensure accuracy, payee identity engine 213 may be configured to provide mechanisms for the payer to confirm the identity of the payee. In some aspects, payee identity engine 213 may be configured to provide sensory confirmation, such as vibrating or sound, to reflect the degree of confidence of the candidate payee(s). In other aspects, payee identity engine 213 may also be configured to interact with interface design engine (not shown) to display, via the customized user interface for the payer, additional information about the suggested recipients (e.g. addresses, phone numbers, ages), the confidence level, and data sources used to suggest recipients.

To provide a flexible way to fund the payer's payment, PPG 202 may execute instructions to provide the payer with one or more funding options associated with the payment transaction. In some embodiments, funding source engine 215 may be configured to determine available funding sources to fund the payment. The available funding source may be internal or external to financial service provider 110. For example, in some embodiments, a payer wishing to transfer money to another person may not need to have an existing account (or open a new account) with financial service provider 110 in order to fund his/her payment. In other embodiments, funding source engine 215 may be configured to consider multiple factors to determine which funding source(s) is the payer's preference, and accordingly suggest this routing option(s) to the payer. For example, to determine the payer's preferred funding sources, funding source engine 215 may consider factors including, for instance, stated/selected preferences, account transaction history, time, costs, user ratings, usage patterns/preferences of other users, linked accounts/sources, available balance(s), available credit, pending transactions (both credit and debit), etc. In some embodiments, a plurality of funding sources may be employed to fund one payment transaction. Routing option engine 215 may also communicate with funding sources to verify information about the proposed transaction. For example, routing option engine 215 may verify availability of funds with a funding source.

To add more flexibility as to how to send payment and how to receive payment, PPG 202 may execute instructions to provide mechanisms for the payer and/or the payee to choose one or more routing options to rail the payment. In some embodiments, routing option engine 217 may be configured to suggest routing options to the payee (same or similar mechanisms may also be provided to the payer consistent with the disclosed embodiments). In some aspects, routing option engine 217 may consider the following data to make routing suggestions:

type of payment,
 available information of the payee,
 locale of the payee,
 feedback and/or ranking of routes used in the past,
 historical behavior, such as, for example, route chosen in the past, and
 other data.

In some embodiments, routing option engine 217 may be configured to determine which payment rail or rails represent the best fit for the payment, and suggest this payment rail(s) to the payee accordingly. In some embodiments, routing option engine 217 may be configured to rank the suggested payment rails by multiple parameters including, for instance, history, safety, speed, cost, stability, and others. Additionally or alternatively, the payee may enter his/her preferred routing option for receiving the incoming payment if his/her preferred routing option is not included in the suggested options. The payee's choice of the routing option may be fed back to routing option engine 217 for making future suggestions. In some aspects, the payee may choose one or more routing options to receive the incoming payment. In other aspects, routing option engine 217 may be configured to prevent the payee from receiving funds twice via different payment rails.

For certain routing rails provided or chosen by the payer and/or the payee, the payment may not be delivered immediately. In some embodiments, credit decision engine 219 may be configured to speed up the availability of funds for receiving the payment. For example, if a payment rail provided or chosen by the payee involves a wait time or clearing period, credit decision engine 219 may be configured to determine the payee's willingness to accept additional cost of expedited payment rails, for example, making the payment via wire transfers. Credit decision engine 219 may also be configured to determine the payee's eligibility for credit advance in order to speed up the availability of funds. Credit decision engine 219 may determine credit eligibility based on, for example, transactions or transaction data, credit history of the Financial Service Provider and/or other Financial Institution, pending transactions, a degree of confidence that a pending transaction will clear successfully, the number and type of products and services that the payer or payee currently consumes with the respective Financial Service Provider, available balances of linked accounts, employment status, or the like. Credit decision engine 219 may further determine eligibility based on other inputs, including credit scoring agencies such as Equifax, TransUnion, Innovis, Experian, or the like. Once credit decision engine 219 determines that the payee is willing and eligible for credit advance, it may be configured to provide mechanisms that allow the payee to apply for credit advance.

Once the payee receives the payment, PPG 202 may execute instructions to provide the payee with some allocation options to redirect the received payment and guide the payee to complete the allocation. Examples of allocation options may include, for example, putting payment towards phone bill, buying a pastry at a bakery nearby, buying candy bars for some children in the same store as the payee, buying items that are on the payee's wish list at online stores such as Amazon, etc. in some embodiments, PPG 202 may execute instructions to perform functions relating to determine these suggested allocation options based on information obtained from, for example, the payee's profile, transaction history, social networking websites, and the like. In other embodiments, the suggested allocation options may be determined based on the payee's location, which may be, for example, a restaurant, a bar, and a store.

Disclosed embodiments may further allow for payments to 3rd party companies as well—for example, paying utility bills. Engines such as interface dialog engine 211, payee identity engine 213, and routing option engine 217, may also provide mechanisms for a payer to pay for items at a local brick-and-mortar store. This can involve, for example, determining the location of a user's device (e.g., one that implements PPG 202) and paying for a bill at a store located near to that device. The location of the payer may be determined, for example, using GPS information from the payer's mobile device, a social network update by the user that indicates a location, or any other source of location information.

To provide a more nature, intuitive, interactive, and flexible payment system, and add more fun to the payment transaction, PPG 202 may execute instructions to perform messaging functions at some or all steps of the payment transaction. In some embodiments, messaging engine 221 may be configured to select an appropriate channel of communication for the payer and the payee (or some other parties associated with the payment transaction). Channels of communication may include, for example, text messaging, email, social networking sites, or the like. In some embodiments, messaging engine 221 may be configured to take into account the payee's preferences in determining which channels of communication to provide. For example, if messaging engine 221 determines that the text message is the most effective or preferred way of communication for the payee, whereas the payer prefers to use emails, messaging engine 221 may translate text messages into email message for the payer, and vice versa. Messaging engine 221 may determine the most effective or preferred way of communication based on factors including, for example, information taken from email accounts, customer history, cell phone, social networking sites, and the like.

In some embodiments, messaging engine 221 may be configured to determine the content of messages displayed to related parties associated with the payment transaction (e.g. the payer, the payee, and other third parties). In some aspects, messaging engine 221 may consider factors including, for example, the type of payment, the payment triggering party, and other static and behavioral inputs in determining the appropriateness of the messaging. Messaging engine 221 may also determine the contents of messages based on other inputs such as regulations—including local, state, or Federal privacy and/or other legal regulations—capable of influencing commercial messaging and information exchange. Messaging engine 221 may also determine the content of messages based on further inputs, including transaction and behavior data (such as social network data), based on a determination of the appropriateness or success rate of a particular message with respect to the receiver of the message. For example, if a user is transferring money to a friend, messaging engine 221 may determine that the message should include an offer from a large retailer—for example, a retailer at which the sender has shopped during the past 6 months, has a linked credit account with, or has recently "liked" on a social media website. Other results are possible. In other aspects, messaging engine 221 may also consider the occasion of payment in determining the content of the message to be displayed to the related parties.

Additionally or alternatively, PPG 202 may execute instructions to perform functions related to offer promotion offers to the user. To ensure the appropriateness of these commercial messages, messaging engine 221 may be configured to determine whether the commercial messages are proper to a particular user or whether the particular user is likely to be responsive to the commercial messages. Determining whether a user will be receptive to a particular offer may depend on multiple inputs—for example, user-set preferences, historic payment behavior such as having shopped at or ordered from a certain store, historic non-payment related information such as having "checked-in" on social media websites at a retail location, membership or loyalty information such as a grocery bonus card membership, whether the user has an electronic gift card for a retailer, or the like. Messaging routing engine 221 may also be used to communicate with the previously-mentioned social networks and/or a text messaging component, in order to open communication channels with a payee. For example, messaging routing engine 221 can enable communication with payees that are also linked with the user on Facebook or LinkedIn. Further, messaging routing engine 221 may also enable communication with payees via text messaging, email messages, phone calls, or the like. One of ordinary skill would understand particular ways of implementing these communication methods/systems.

To keep parties associated with the payment transaction updated with respect to the progress of the payment transaction, PPG 202 may execute instructions to provide mechanisms that allow the parties to be informed of the progress of the payment transaction. For example, payment status engine 223 may be configured to interact with various parties in the payment chain to determine the stage of completion of the payment transaction. In some embodiments, the payment status may be presented to the user in the form of, for example, a progress bar, text, graphics, etc. In some aspects, payment status engine 223 may provide detailed feedback with respect to the status of the payment to the parties. For example, payment status engine 223 may be configured to send a confirmation message when the payment is completed. In other aspects, information relating to payment status may be used for fraud control and overall stability of the payment option offered.

Payment network/gateway access engine 225 may enable access to multiple payment networks, Payment networks could include, for example, networks such as those run by credit card companies (PLUS, CIRRUS), independent payment networks (NYCE, STAR), or the like. Payment networks might be accessed directly by the engine or through payment processors or gateways. Gateways and payment processors could include, for example, third party companies such as First Data, FIS, and TSYS. Payment network/gateway access engine 225, in some embodiments, can be configured to allow access to those systems for routing payments and transaction information.

PPG 202 may execute instructions to perform other functions consistent with the disclosed embodiments, Examples of these functions may include the following:

Simulation environment—PPG 202 may provide a simulation environment for the user without actually requiring them to engage in a real transaction. The simulation environment may provide most of the described functions consistent with the disclosed embodiments, Gamification—PPG 202 may determine and generate incentives (both virtual and/or real) for rewarding the user for performing certain personal payment related activities, such as, for example, opening a new account. The incentives may include earning status such as, for example, a gold/silver/bronze or superstar/starlet/standing rating associated with an account. Real and virtual rewards may also be given for sharing the personal payment experience on social networks and recommending it to other entities or users (e.g., friends, business partners, etc.). Based on information such as, for example, user profiles and prior transaction behavior, this function may include determining whether to grant incentives and the level of incentives to be granted.

Minimum data input—PPG 202 may minimize the data the user has to provide in some aspects, depending on payment rails and/or routing options chosen by the user, the process may narrow the data request to only the data necessary for the transaction. In other aspects, by integrating with the user's contact, social network, and the user's phone book, the user may only be required to enter into the amount of payment and one or more of the intended payee's phone number, email address, or name to effect a payment. Additional or alternatively, by integrating historic payment behavior of both the payer and the payee, part of the information may be filled in automatically.

Constraint features—PPG 202 may provide mechanisms that allow the user to set her/his preference with respect to constraints to making payments. For example, the user may choose to prevent payments form being made after a certain time (e.g. 3 a.m.) or to prevent making payments to certain payees (e.g. bars). This function may also provide some pre-set limitations or suggested limitations based on multiple inputs, such as, for example, the type of the payment, the location, the time zone of the user, or the like.

Crowd sourcing and social sharing—PPG 202 may provide mechanisms that allow the user to share her/his experience relating to making personal payment using disclosed embodiments with other individuals or entities via social networking sites or other broadcast medium.

Aggregation of feedback—PPG 202 may provide mechanisms that allow the user to rate, for example, his experience relating to making personal payments, using payment rails, particular routing options, or other functions consistent with the disclosed embodiments.

Recurring payment—PPG 202 may provide mechanisms that allow users to make recurring payments. This function may be performed to determine whether the payment is a one-time payment or a recurring payment. Recurring payment may either be a fixed recurring amount (for example, paying rent) or a flexible recurring amount (for example, paying utilities bills), or any other amount (e.g., a fluctuating amount).

Figure 3:
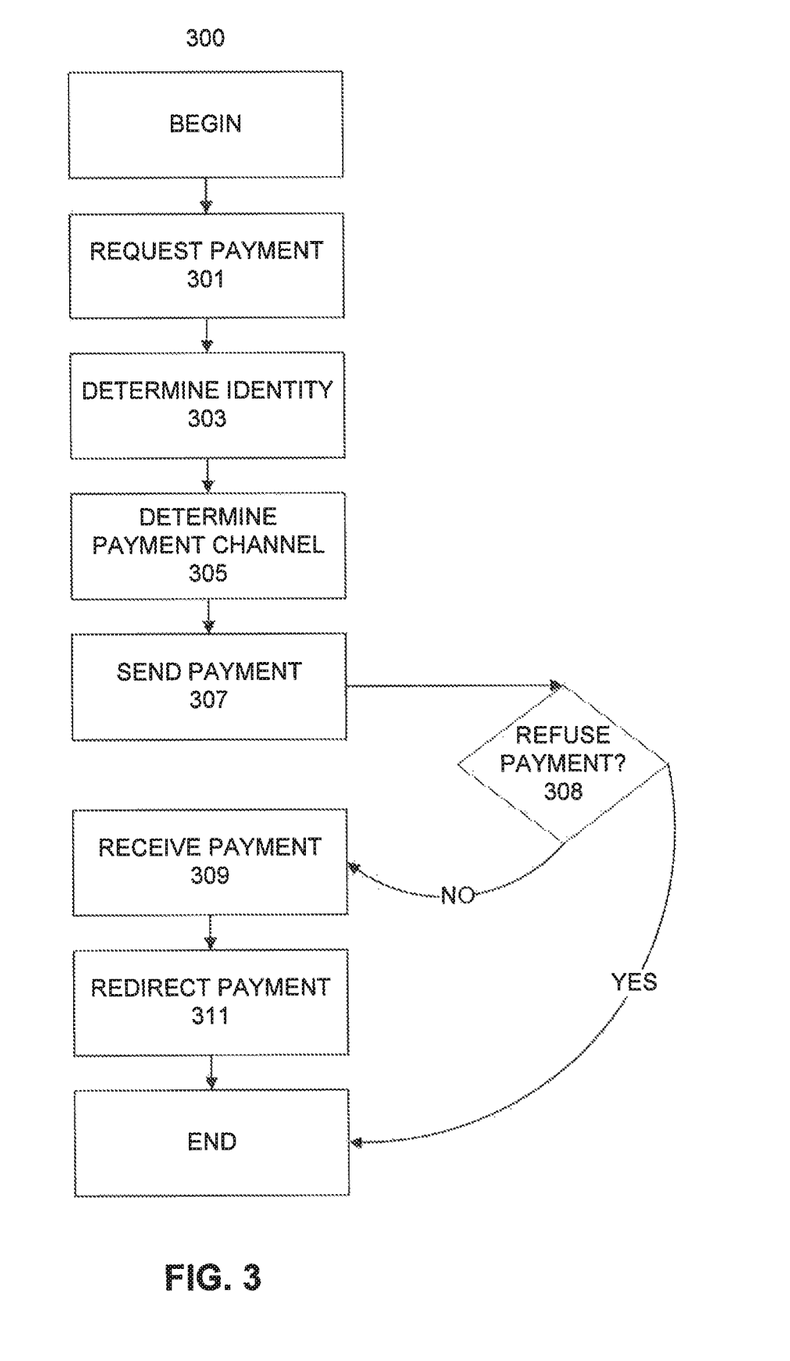
FIG. 3 is an exemplary process flow for effecting a payment transaction consistent with the disclosed embodiments.

FIG. 3 illustrates a general overview of an exemplary process flow of PPG 202 that may be performed by the disclosed embodiments. Blocks 301-311 represent multiple steps in an exemplary process of effecting a payment transaction.

At step 301, PPG 202 may execute instructions to provide mechanisms that allow a payer, or a payee, or PPG 202 to initiate a payment transaction. In some embodiments, a payer may initiate a payment request. The payer may initiate the payment request from the website of financial service provider 110. Alternatively, the payer may initiate the payment request by using the application of PPG 202 downloaded into his/her computing device—for example, a smartphone or a tablet.

In some embodiments, the payee may initiate the payment request. For example, the payee may request the payment by providing information such as, for example, the payer's name, date of request, payment amount, and reason for requesting this payment. The payee may initiate the payment request from the website of financial service provider 110. Alternatively, the payee may initiate the payment request by using the application of PPG 202 downloaded into his/her computing device, preferably, a smartphone or a tablet. To process the payment transaction initiated by the payee, PPG 202 may execute instructions to perform some aspects of the functions consistent with the disclosed embodiments for processing the payment transactions initiated by the payer. For example, payee identity engine 213 may be configured to suggest intended payers to the payee based on the payer's name provided by the payee. Routing option engine 217 may be configured to allow the payee to choose a payment rail that the payer is likely to accept. Moreover, messaging routing engine 221 may be configured to provide mechanisms that allow the payee to initiate parallel messages with the payer and exchange documents with the payer.

In some embodiments, PPG 202 may execute instructions to trigger a payment. For example, PPG 202 may have engines/modules that may be configured to send a reminder or a suggestion for a new payment to a payer. In some aspects, these engines/modules may be configured to obtain information from, for example, calendars, payment history, and social networking sites, or the like to identify relevant events that might warrant a payment, and determine whether to send reminders or suggestions. For example, these engines/modules may determine through a social networking site (e.g. Facebook) that a relative of the payer has an approaching birthday, and based on this determination, a suggestion may be given to the payer to send a gift card or other type of payment to the relative as a birthday gift.

At step 303, the recipient's identity may be determined. Using, for example, payee identity engine 213, disclosed embodiments can utilize a system to determine the correct recipient of funds. As mentioned earlier, social networks, public identity databases, or personal data stores can be accessed to determine, based on the entry of some information (e.g., a first name, a last name, an address, or some other input), the proper recipient of the funds to be paid in this transaction.

When attempting to identify the recipient, step 303 can also include functionality to determine and list the number and relevancy of possible "hits" (i.e., search results) for possible recipients. This, in turn, enables the user and/or the user's device to choose a possible recipient. The relevancy may be a measure of ranking—for example, if payee identity engine 213 determines that the user has had previous interactions with a specific payee, the payee happens to be a "Friend" on a social networking site, and the payee frequently receives money from the user, payee identity engine 213 could identify the payee as a likely target. Images, addresses, or the like, can also be displayed on the device (possibly gathered from aforementioned sources—such as social networks or public identity aggregators) to better aid the user in deciding which recipient is the proper recipient of the funds.

Similar processes are usable when the process is performed by a user requesting money. That is, when a user is attempting to collect, for example, on a past bill, the device may implement functions on payee identity engine 213 to determine the likely identity of the payer. This would enable a requesting payee to better determine who he is requesting payment from, and make sure that he is not opening communication with someone who does not actually owe the payee money.

Step 303 may also, in some embodiments, enable the user to decide on a particular method of communication with the payee, and enable that communication to take place. For example, messaging engine 221 may be utilized to begin communication between the two parties over the aforementioned social networks, email, text messaging, or the like. This can enable communication to take place before, during, or after the payment transaction has taken place.

At step 305, a payment channel may be chosen by the user. PPG 202 may execute instructions to provide mechanisms that facilitate the payer to send the payment. Routing option engine 217, in some embodiments, may be configured to suggest routing options by considering factors including, for example, type of payment, available information of an intended payee, location of the payee, transaction history, the payer or the intended payee's preferred routing options, etc. In some embodiments, routing option engine 217 may be configured to rank the suggested routing options by multiple parameters such as, for example, safety, speed, cost, stability, history (e.g., customer experience), and etc.

Additionally, as part of step 305, initial connections and interfaces may be made to payment networks. For example, payment companies such as clearXchange, Dwolla, PayPal, ViaFone, banking institutions, or the like, may all be interacted with to determine the payment rails that are appropriate for use between the payer and the payee.

Additionally or alternatively, to assist the payee to select the routing option, PPG 202 and/or routing option engine 217 may be configured to provide commercial messages to the payee associated with one or more routing options. For example, if a routing option requires the payee to open a new bank account with financial service provide 110, the payee may receive some commercial message relating to the incentives to open a new bank account. Messaging engine 221 may be configured to determine what message to display to the payee. The determination may be based on the occasion and the type of the payment, among other considerations.

In some embodiments, certain routing options may involve some cost, and in these situations, PPG 202 may be configured to suggest routing options based on such considerations as well. And, once a particular routing option involving cost becomes selected, PPG 202 may be configured to determine how to distribute the cost associated with the routing option at step 550. In some aspects, the payer may choose a way to distribute the cost. For example, the payer may bear the cost on his/her own, share the cost with the payee, or choose to have the payee to bear the cost. In other aspects, PPG 202 may be configured to provide mechanisms that allow the payer to prohibit the use of certain routing option(s) involving cost.

Step 307 involves functionality for actually sending the payment. Using the above-mentioned determined payment rails, determined payee identity, and with the previously-mentioned messaging components, payment may be sent to the payee. Step 307 may also involve functionality to allow the payer to select a payment type. In some embodiment, if the payer initially chooses to send the payment by cash and enters into the amount of money he/she wants to transfer, PPG 202 may be configured to provide alternative payment types (e.g., sending a gift card instead of money). In some embodiments, based on the information about the intended payee and the payment type, PPG 202 may be configured to determine whether the payment is for a particular purpose, such as, the intended payee's birthday. If the particular purpose is confirmed, PPG 202 may be configured to execute instructions to perform functions consistent with the disclosed embodiments such as, for example, suggesting alternative payment type (e.g., purchase of an item appearing on the "wish list" of an online account associated with the payee), allowing the payer to send a birthday card or upload a picture or a video together with the payment.

Step 307 may also involve functionality for enabling the payer to choose a funding source to fund his/her payment. In some embodiments, funding source engine 215 (some aspects were discussed in greater detail above) may be configured to determine available funding sources to make the payment, which may be internal and/or external to financial service provider 110. In other embodiments, funding source engine 215 may be configured to estimate preferred source(s) of funds and determine which one(s) to suggest to the payer.

In addition, in some embodiments, PPG 202 may receive notification that the payee has refused the payment (step 308). PPG 202 may receive an indication that the payment was refused because, for example, the amount of the payment was incorrect or the user has already been paid back (either through the disclosed systems, in person, or through another means). In some embodiments, a communication may be sent back to the payer to inform him of the refused payment.

Step 309 involves functionality for receiving a payment at the payee's end. To assist the payee in receiving the payment in a flexible and timely manner, PPG 202 may be configured to perform functions including, for example, sending a notice to the payee informing him/her of the incoming payment, providing the payee with the option to reject or accept the payment, suggesting routing options to receive the payment, and providing the option of receiving the payment immediately if the selected routing option has a wait time to deliver the payment. PPG 202 may be configured to provide a notice to the payee informing him/her of the incoming payment according to some embodiments. For example, the previously-mentioned social networks, email systems, and text messaging operations can be used to send messages to the recipient. Other communications methods are possible, and will be recognized by one of ordinary skill in the art.

PPG 202 may be configured to perform mechanisms that allow the payee to either accept or reject the incoming payment according to some embodiments. In some aspects, PPG 202 may be configured to provide mechanisms that allow the payee to provide reasons for rejecting the incoming payment, which may include, for example, the payment amount is incorrect.

Once the payee accepts the payment, PPG 202 may be configured to provide the payee with routing options for receiving the payment according to some embodiments. In some embodiments, routing option engine 217 of PPG 202 (some aspects were discussed in greater detail above) may be configured to suggest routing options by considering factors including, for example, type of payment, available information of an intended payee, location of the payee, transaction history, the payer or the intended payee's preferred routing options, and the like. In some embodiments, routing option engine 217 may rank suggested options by multiple parameters such as, for example, safety, speed, cost, stability, history (e.g., customer experience), etc. In other embodiments, routing option engine 217 may be configured to determine which rails are best fits for the payee and which rails should be offered to the payee.

Depending on the selected routing option, the payee may not receive immediate payment. For example, if the payer deposits some money directly into the payee's bank account, the payee may be restricted from withdrawing or using the payment immediately. Credit decision engine 219 of PPG 202 may be configured to determine whether the payee is willing and eligible to apply for credit advances. And credit decision engine 219 may be configured to provide mechanisms that allow the payee to apply for credit advances once such a determination is made.

In some embodiments, PPG 202 may execute instructions to facilitate the payee to redirect the received payment to another recipient, as shown in FIG. 3 at step 311. In these situations, the payee may act as the payer. For example, PPG 202 may be configured to determine available allocating options to redirect a received payment of the payee (some aspects were discussed in greater detail above). In some embodiments, if the payee received a gift card, the payer may receive some commercial message relating to the incentive (e.g. receive a discount) to use the payment with certain vendors.

Figure 4A:
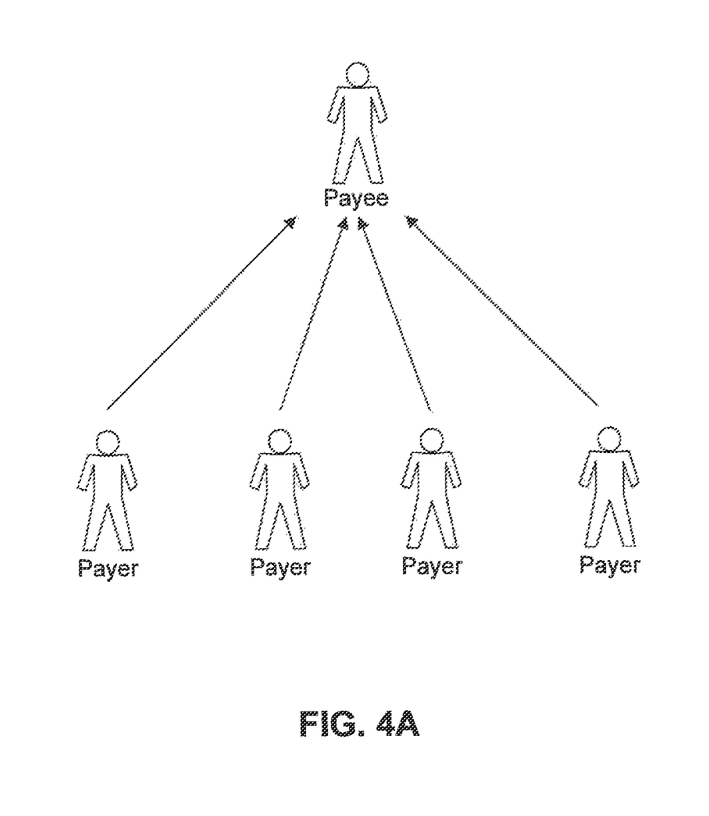
FIG. 4A is an example group payment scenario consistent with disclosed embodiments.

As illustrated in FIG. 4A, according to some embodiments, PPG 202 may be configured to allow the user to make multiple-party payment transactions. In some aspects, the user may share his/her payment request with the rest of the group. PPG 202 may be configured to process the received payments and combine the funds into a single transaction to the payee. In other aspects, PPG 202 may also be configured to perform functions that enable the user to collect money from parties for various other purposes. For example, the user may use PPG 202 to raise funds for a charity. In another example, PPG 202 may also perform functions that enable the user to run an office pool to raise funds for various purposes. These embodiments may provide options to treat the payer(s) as an individual or as a group.

Figure 4B:
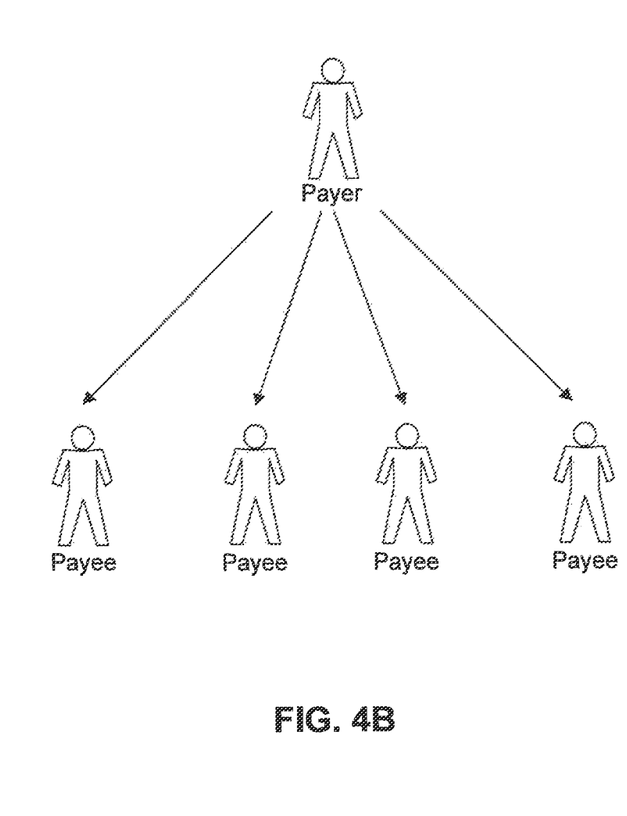
FIG. 4B is another example group payment scenario consistent with disclosed embodiments.

As illustrated in FIG. 4B, according to some embodiments, PPG 202 may be configured to allow the user to make multiple-party payments. In some aspects, the user may pay multiple users in a group. For example, a user may wish to distribute funds to a group of friends, a parent may wish to give her children $20 each for pocket money, or a small business owner may wish to pay investors dividends. Other examples and features are possible as well.

Figure 5A:
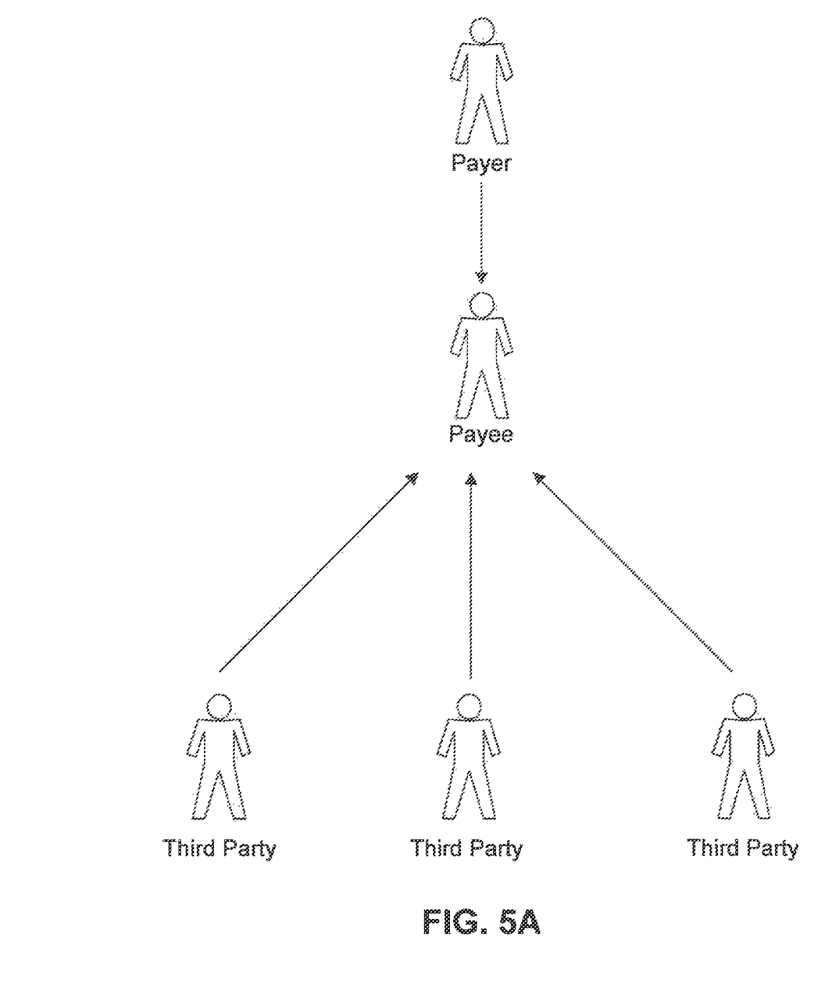
FIG. 5A is an example third party payment scenario consistent with disclosed embodiments.
Figure 5B:
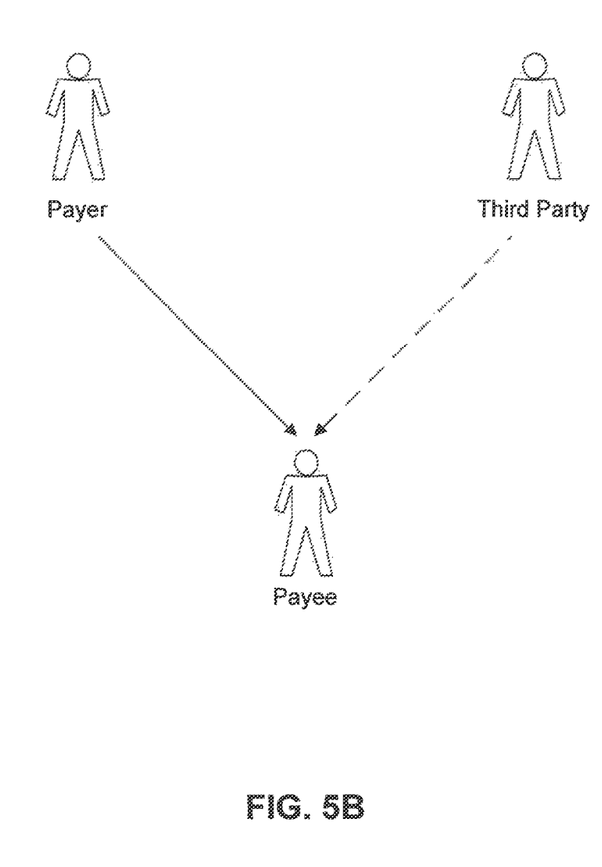
FIG. 5B is another example third party payment scenario consistent with disclosed embodiments.

As illustrated in FIGS. 5A and 5B, according to some embodiments, PPG 202 may be configured to perform functions that allow the payer to make a payment on behalf of other parties. In some aspects, as illustrated in FIG. 5A, a payer may choose to make the payment for parties within a certain geographic vicinity of the payer. For example, the payer may buy beers for everyone within ten feet of the user at a bar. PPG 202 determine the identity of individuals within a certain geographic vicinity based on various sources including, for example, GPS data or information from social networking websites. In other aspects, as illustrated in FIG. 5B, a payer may make a payment on behalf of a third party indirectly by predetermining a payee. For example, if parents (the payer) pay the rent on behalf of their child (third party), the child may not have any options in terms of changing the payee, the amount, and the like, but only have the option to approve the transaction.

Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system for facilitating a personal payment transaction comprising:
    a processor; and
    a storage device storing instructions that, when executed by the processor, cause the system to perform operations comprising:
    receiving, from a client device associated with a payer, identifying information about a payee for initiating a payment transaction;
    determining a location of the client device using at least one of GPS information from the client device or a social network update;
    determining, based on at least the determined location, the identifying information, and at least one of a location of a payee or a location of a device associated with the payee, one or more identities of potential payees using at least one data source selected from a public identity aggregator, a social network, past interactions between the payee and the payer, or a database;
    providing, to the client device, options to fund a personal payment to a selected payee using at least one of a transaction history associated with the client device or usage patterns associated with a plurality of other client devices;
    providing one or more options to the client device and the selected payee for routing the payment associated with the personal payment transaction using the transaction history associated with the client device, wherein the one or more options for routing the payment includes the payer making a payment to a third party on behalf of the selected payee;
    receiving, from the client device, an indication of a selected funding option and a selected routing option;
    when the selected routing option involves a wait time, speeding up a delivery of the payment by a credit decision engine configured to speed up the availability of funds for receiving the payment and to select a routing rail for transmitting the payment, wherein the routing rail is determined based on rankings by other users on history, safety, speed, cost, or stability of a respective routing rail when not speeding up the delivery of the payment by the credit decision engine; and
    transmitting the payment to the selected payee using the selected funding option.

2. The system of claim 1, wherein past interactions between the payer and the selected payee include at least one of person-to-person payments or person-to-business payments.

3. The system of claim 1, wherein the storage device stores further instructions that, when executed by the processor, cause the system to determine a payment the routing rail based on past usage by at least one of the payer or the selected payee when not speeding up the delivery of the payment by the credit decision engine.

4. The system of claim 1, wherein the one or more options for routing the payment include enabling the selected payee to determine how to receive the payment.

5. The system of claim 4, wherein the storage device stores further instructions that, when executed by the processor, cause the system to receive, from the selected payee, an indication of how to receive the payment, wherein the selected payee is able to receive the payment as at least one of: a deposit into an account, a prepaid card, a gift card, a paper check, a cash pickup, funds for opening a new account, or a payment towards a pending bill.

6. The system of claim 1, wherein the storage device stores further instructions that, when executed by the processor, cause the system to provide one or more channels for the payer and selected payee to communicate.

7. The system of claim 1, wherein the credit decision engine is configured to determine the selected payee's eligibility for credit advance to speed up the availability of funds.

8. A method for facilitating a person payment transaction, comprising:
   receiving, from a client device associated with a payer, identifying information about a payee for initiating a payment transaction;
   determining a location of the client device using at least one of GPS information from the client device or a social network update;
   determining, based on at least the determined location, the identifying information, and at least one of a location of a payee or a location of a device associated with the payee, one or more identities of potential payees using at least one data source selected from a public identity aggregator, a social network, past interactions between the payee and the payer, or a database;
   providing, to the client device, the one or more identities of potential payees;
   receiving, from the client device, an indication of a selected payee from the one or more identities of potential payees;
   providing, to the client device, options to fund a personal payment to a selected payee using at least one of a transaction history associated with the client device or usage patterns associated with a plurality of other client devices;
   providing one or more options to the client device and the selected payee for routing the payment associated with the personal payment using the transaction history associated with the client device, wherein the one or more options for routing the payment includes the payer making a payment to a third party on behalf of the selected payee;
   receiving, from the client device, an indication of a selected funding option and a selected routing option;
   when the selected routing option involves a wait time, speeding up a delivery of the payment by a credit decision engine configured to speed up the availability of funds for receiving the payment and to select a routing rail for transmitting the payment, wherein the routing rail is determined based on rankings by other users on history, safety, speed, cost, or stability of a respective routing rail when not speeding up the delivery of the payment by the credit decision engine; and
   transmitting the payment to the selected payee using the selected funding option.

9. The method of claim 8, wherein past interactions between the payer and the selected payee include at least one of person-to-person payments or person-to-business payments.

10. The method of claim 8, further comprising determining the routing rail based on past usage by at least one of the payer or the selected payee when not speeding up the delivery of the payment by the credit decision engine.

11. The method of claim 8, wherein the one or more options for routing the payment include enabling the selected payee to determine how to receive the payment.

12. The method of claim 11, further comprising receiving, from the selected payee, an indication of how to receive the payment, wherein the selected payee is able to receive the payment as at least one of: a deposit into an account, a prepaid card, a gift card, a paper check, a cash pickup, funds for opening a new account, or a payment towards a pending bill.

13. The method of claim 8, further comprising providing one or more channels for the payer and selected payee to communicate.

14. The method of claim 8, further comprising:
   estimating a confidence level related to the one or more determined identities, based on at least how many data sources are used to determine the one or more identities; and
   providing, to the client device, at least one estimated confidence level corresponding to at least one of the one or more identities.

15. The method of claim 8, wherein determining the one or more identities further comprises determining at least two possible identities based on the identifying information.

16. The method of claim 8, wherein the credit decision engine is configured to determine the selected payee's eligibility for credit advance to speed up the availability of funds.

* * * * *